O. KYLIN.
POWER ACTUATED CHUCK.
APPLICATION FILED JULY 9, 1917.
1,288,051.
Patented Dec. 17, 1918.
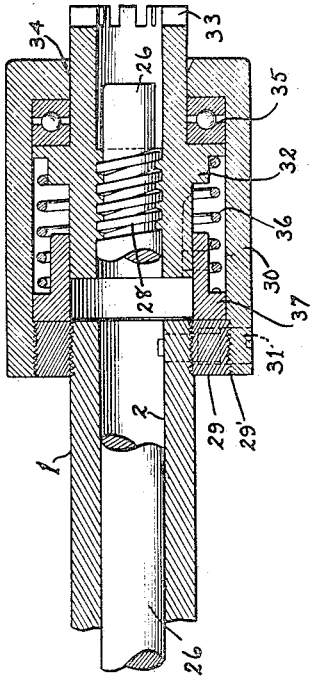
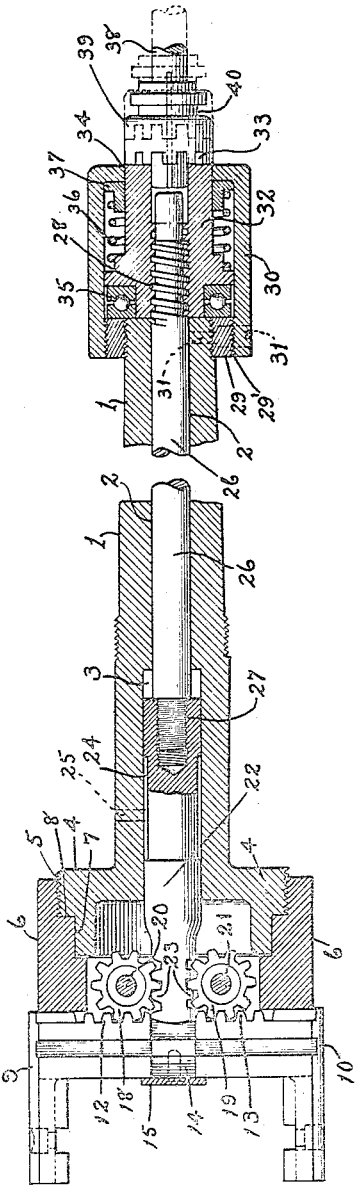
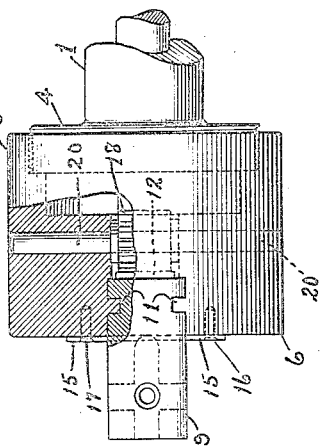
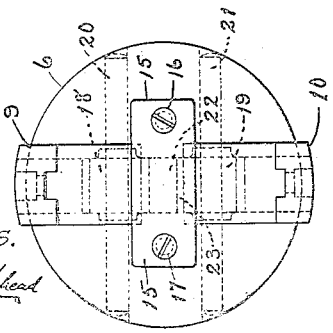
Inventor
Oskar Kylin
By Louis C. Vanderlip Atty.
Witness

UNITED STATES PATENT OFFICE.

OSKAR KYLIN, OF ELKHART, INDIANA.

POWER-ACTUATED CHUCK.

1,288,051.

Specification of Letters Patent.

Patented Dec. 17, 1918.

Application filed July 9, 1917. Serial No. 179,307.

*To all whom it may concern:*

Be it known that I, OSKAR KYLIN, a subject of the King of Sweden, but having declared my intention of becoming a citizen of the United States, and resident of the city of Elkhart, county of Elkhart, and State of Indiana, have invented certain new and useful Improvements in Power-Actuated Chucks, of which the following is a full, clear and exact specification.

My invention relates to metal working lathe chucks and more especially to power actuated and controlled chucks for use in multiple-spindle lathes.

The principal object of my invention is the production of improved clutch actuated mechanism for opening and closing a pair, or more, of radially movable chuck jaws. Other objects of my invention will be mentioned and described hereinafter.

The preferred embodiment of my invention is well illustrated in the accompanying drawings, in which Figure 1 is a longitudinal section through a lathe spindle carrying the chuck jaws and clutch actuated mechanism of my invention and illustrating the chuck jaws and mechanism used for gripping the work when the chuck jaws are contractedly actuated; Fig. 2 is an end view of the chuck jaws and jaw carrier; Fig. 3 is a fragmentary view in section illustrating a modification for gripping a tubular or hollow piece of work by expansively actuating the chuck jaws; and Fig. 4 is a fragmentary view showing the chuck jaw carrier broken away and a top plan view of one of the chuck jaws.

Similar numerals of reference refer to similar members and parts of members throughout the several views on the drawings.

Referring to the drawings in detail, the numeral 1 indicates a spindle adapted to be revolubly mounted in any suitable manner in a spindle carrier (not shown) adapted to serve as a mount for one or more of the spindles, said spindle being adapted also to be connected with any suitable driving mechanism (not shown) for the rotation thereof. The numeral 2 indicates a plunger shaft bore open at both ends thereof, one end thereof being in communication with the larger bore 3 which extends through the spindle enlargement 4. The numeral 5 indicates screw threads carried by the spindle enlargement 4 and upon which the chuck jaw carrier 6 is screw threaded, said enlargement being reduced somewhat in diameter at 7 to form an abutment for the shoulder 8 of said carrier.

The numerals 9 and 10 indicate a pair of radially slidable chuck jaws connected with the carrier member 6 by radially disposed tongue and groove connection 11 (see Fig. 4) for effecting a radially slidable movement of said chuck jaws. The numerals 12 and 13 indicate tooth racks radially arranged upon the rear walls, respectively, of the chuck jaws 9 and 10 and adapted to mesh with spur pinions hereinafter described. The numeral 14 indicates a chamber intermediate the inner extremities of the body portion of the chuck jaws, said chamber being covered by a plate 15 detachably fastened to the carrier 6 by the screws 16 and 17, or in any other suitable manner, and adapted to exclude metal chips, or other deleterious material, from said chamber. The numerals 18 and 19 indicate a pair of spur pinions revolubly mounted upon the pins 20 and 21, respectively, said pins being rigidly secured in suitable apertures carried by the carrier member 6, said pinions meshing with the chuck jaw racks 12 and 13, respectively.

The numeral 22 indicates a driver plunger slidably arranged in the spindle bore 3, projecting therefrom and provided with a flattened end portion which carries the opposed tooth racks 23, 23 adapted for engagement with the pinions 18 and 19, whereby, when longitudinal movement of said plunger is effected, said pinions are partially rotated and radial movement imparted to the chuck jaws 9 and 10.

The numeral 24 indicates a reduced portion formed on the plunger 22 intermediate its extremities and adapted to serve as a lubricant chamber, an aperture 25 in the spindle 1 serving to enable the introduction of lubricant thereto. The numeral 26 indicates a driver plunger extension slidably mounted in the spindle bore 2 and having one end thereof in screw threaded connection at 27 with the plunger member 22, the opposite end thereof projecting beyond the bore 2 and having a square screw threaded portion 28 thereon. The numeral 29 indicates a collar screw threaded upon the spindle 1 adjacent one end thereof and provided with screw threads 29' upon its outer periphery, the driver casing 30 being screw threaded upon said collar by virtue of the threads 29', rotation of said collar and said casing on the spindle being prevented by a pin, or screw, 31, which penetrates both collar and casing and is rigidly fastened in said spindle.

The numeral 32 indicates a driver member rotatively arranged within the driver casing 30 and provided with tooth clutch member 33 which projects through the centrally disposed end opening 34 of said casing, said driver having screw threaded connection with the plunger extension 26 through the square threads 28 and adapted, when rotated, to impart longitudinal sliding movement to said driver plunger extension, whereby the pinions 18 and 19 are partially rotated, thereby imparting radial movement to both of said chuck jaws. The numeral 35 indicates a ball bearing unit against which the driver member 32 is pressed by the coil spring 36, the latter being seated upon a nut 37 sleeving the driver 32.

The numeral 38 indicates a driver shaft mounted and driven in any suitable manner and adapted to be rotated alternately in opposite directions by any suitable mechanism (not shown) for alternately opening and closing the chuck jaws 9 and 10. The numeral 39 indicates a tooth clutch splined upon the driver shaft 38 adjacent the clutch 33, of said driver, and provided with a shifter groove 40 which is adapted to be engaged by any suitable clutch shifting mechanism (not shown) for effecting periodical engagement and disengagement of said clutches.

The threads 28, indicated in Fig. 1, are right hand threads and are adapted to radially actuate the chuck jaws 9 and 10 inwardly for gripping the stock on the inward movement of said jaws. It is advantageous and quite necessary, frequently, to chuck a tubular, or hollow, article or piece of work, between said chuck jaws, the outer periphery of which must not be engaged by the jaws of the chuck on account of possible injury thereto. In such an event the chucking is accomplished by the expansive or outward radial movement of the chuck jaws within and against the bore of the tubular or hollow stock to be machined on its exterior periphery. Such a method of chucking requires a driver member 32 connected with the plunger extension 26 by left hand threads, as indicated in Fig. 3, and a reversal of the location of the ball thrust bearing 35 to meet the reverse action of the plunger 26 on the chuck jaw gripping movement, as well as a modified form of the spring seat nut 37 and the driver member 32, as clearly indicated in the drawings of Fig. 3.

In operation, the exertion of the coil spring 36 on the driver member 32 shown in Fig. 1 projects the latter forward and ordinarily maintains it in contact with the roller bearing unit 35, thereby moving the plunger members 22 and 26 forward, whereby the chuck jaws 9 and 10 are opened outwardly for the insertion of the stock.

In the operation of the modification shown in Fig. 3, wherein the gripping of the stock is effected by the radially expansive, or outward, movement of the chuck jaws, the exertion of the coil spring 36 impels the driver member 32 in the opposite direction, whereby the chuck jaws are normally opened for stock insertion by an inward radial movement thereof.

I claim:

1. The combination with the work supporting spindle of a lathe and the movable chuck jaws carried thereby, of a longitudinally movable plunger carried by said spindle; mechanism operatively connecting said plunger and said chuck jaws whereby a substantially radial movement is imparted to said chuck jaws when said plunger is longitudinally actuated; a revoluble compound plunger driver and clutch; means operatively connecting said compound member and said plunger whereby the latter is longitudinally moved when the former is rotated; and clutch means for rotating said compound driver and clutch.

2. The combination with the work supporting spindle of a lathe and the movable chuck jaws carried thereby, of a longitudinally movable plunger carried by said spindle and adapted to be moved back and forth thereon; mechanism operatively connecting said plunger and said chuck jaws whereby a substantially radial movement is imparted to said chuck jaws when said plunger is longitudinally actuated; a revoluble compound plunger driver and positive clutch; means operatively connecting said compound driver and clutch with said plunger whereby the latter is longitudinally actuated when the former is rotated, said compound driver and clutch being adapted for reversible rotation for alternately opening and closing said chuck jaws; and clutch means for rotating said compound driver and clutch.

3. The combination with the work supporting spindle of a lathe and the movable chuck jaws carried thereby, of a longitudinally movable plunger sleeved by said spindle; a revoluble compound plunger driver and clutch; a complementary spiral connection between said plunger and said compound member; mechanism operatively connecting said plunger and said chuck jaws whereby a substantially radial movement is imparted to said chuck jaws when said plunger is longitudinally actuated; and clutch mechanism connected with the clutch of said compound member for rotating said compound driver and clutch.

4. The combination with the work supporting spindle of a lathe and the movable chuck jaws carried thereby, of a longitudinally movable plunger sleeved by said spindle; mechanism operatively connecting said plunger and said chuck jaws whereby a substantially radial movement is imparted to said chuck jaws when said plunger is longitudinally actuated; means for normally holding said chuck jaws in a position to enable stock insertion; rotative means operatively connected with said plunger whereby a longitudinal movement thereof is effected when said rotative means is actuated; and means for actuating said rotative means.

5. The combination with the work supporting spindle of a lathe and the movable chuck jaws carried thereby, of a longitudinally movable plunger sleeved by said spindle; mechanism operatively connecting said plunger and said chuck jaws whereby a substantially radial movement is imparted to said chuck jaws when said plunger is longitudinally actuated; yieldable impelling means for normally holding said chuck jaws in a position to enable stock insertion; rotative means operatively connected with said plunger whereby a longitudinal movement thereof is effected when said rotative means is actuated; and means for actuating said rotative means.

6. The combination with the work supporting spindle of a lathe and the movable chuck jaws carried thereby, of a longitudinally movable plunger sleeved by said spindle; a revoluble plunger driver; a complementary spiral connection between said plunger and said plunger driver; mechanism operatively connecting said plunger and said chuck jaws whereby a substantially radial movement is imparted to said chuck jaws when said plunger is longitudinally actuated by the rotation of said plunger driver; impelling means actuating said plunger driver, whereby the chuck jaws are normally opened to enable stock insertion; and means for rotating said revoluble plunger driver.

7. The combination with the work supporting spindle of a lathe and the movable chuck jaws carried thereby, of a longitudinally movable plunger sleeved by said spindle; a revoluble plunger driver; a complementary spiral connection between said plunger and said plunger driver; mechanism operatively connecting said plunger and said chuck jaws whereby a substantially radial movement is imparted to said chuck jaws when said plunger is longitudinally actuated by the rotation of said plunger driver; resilient impelling means actuating said plunger driver, whereby the chuck jaws are normally opened to enable stock insertion; and means for rotating said revoluble plunger driver.

8. The combination with the work supporting spindle of a lathe and the movable chuck jaws carried thereby, of a longitudinally movable plunger sleeved by said spindle; a revoluble plunger driver; a complementary spiral connection between said plunger and said plunger driver; mechanism operatively connecting said plunger and said chuck jaws whereby a substantially radial movement is imparted to said chuck jaws when said plunger is longitudinally actuated by the rotation of said plunger driver; a spring impelling said plunger driver, whereby the chuck jaws are normally opened to enable stock insertion; and means for rotating said revoluble plunger driver.

9. In a device of the class described, a work carrying spindle; a longitudinally movable plunger sleeved by said spindle; a revoluble plunger driver; a complementary spiral connection between said plunger and said plunger driver; a spring impelling said plunger driver for effecting longitudinal movement of said plunger; and a seat for said spring.

10. In a device of the class described, a work carrying spindle; a longitudinally movable plunger sleeved by said spindle; a revoluble plunger driver; a complementary spiral connection between said plunger and said plunger driver; a casing encompassing said plunger driver; a spring engaging and impelling said plunger driver for effecting longitudinal movement of said plunger; a seat for said spring; and an anti-friction thrust bearing for said plunger driver.

11. In a device of the class described, a work carrying spindle; a longitudinally movable plunger sleeved by said spindle; a spring impelled revoluble compound plunger driver and clutch member; a complementary spiral connection between said compound member and said plunger; and a casing for said compound driver and clutch member.

12. In a device of the class described, a work carrying spindle; a longitudinally movable plunger sleeved by said spindle; a spring impelled revoluble compound plunger driver and positive clutch member; a complementary spiral connection between said plunger and said compound driver and clutch member; and an anti friction thrust bearing for said plunger driver.

13. In a device of the class described and in combination with the chuck jaw carrier, the radially movable chuck jaws and the chuck jaw guideway, a cover plate carried by said carrier and extending over said guideway and the inner ends of the chuck jaws, said cover plate being adapted to exclude deleterious matter from said chuck jaw guideway.

14. In a device of the class described and in combination with the chuck jaw carrier, the radially movable chuck jaws and the chuck jaw guideway, a cover plate detachably mounted upon said jaw carrier and extending over said guideway and the inner ends of the chuck jaws, said cover plate being adapted to exclude deleterious matter from said chuck jaw guideway.

In testimony whereof I have hereunto affixed my signature this 7th day of July, 1917.

OSKAR KYLIN.